United States Patent [19]
Derevyankin et al.

[11] 3,945,886
[45] Mar. 23, 1976

[54] CONTROL ROD FOR NUCLEAR REACTOR

[76] Inventors: Nikolai Efimovich Derevyankin, ulitsa Sovnarkomovskaya, 30, kv. 115; Vladimir Ivanovich Evseev, ulitsa Strazh Revoljutsii, 22, kv. 21; Ivan Ilich Zhuchkov, ulitsa 22 Partsiezda, 6/2, kv. 60; Oleg Borisovich Samoilov, ulitsa Sovnarkomovskaya, 32, kv. 20; Alexandr Vasilievich Ovechkin, ulitsa Tolbukhina, 6, kv. 2, all of Gorky, U.S.S.R.

[22] Filed: Oct. 21, 1974

[21] Appl. No.: 516,471

[52] U.S. Cl. ............................ 176/86 R; 176/35
[51] Int. Cl.² ........................................... G21C 7/10
[58] Field of Search .............. 176/36 R, 35, 86 R

[56] References Cited
UNITED STATES PATENTS
3,361,635  1/1968  Long ................................. 176/35

FOREIGN PATENTS OR APPLICATIONS
241,003  1/1960  Australia ........................... 176/86 R

*Primary Examiner*—Harvey E. Behrend
*Attorney, Agent, or Firm*—Holman & Stern

[57] ABSTRACT

A control rod for a nuclear reactor in an articulated form, and including a series of pivotally connected links. At least one of these links is disclosed, the endmost one, serves as a means for the collection of a gas, with the rest of the links containing a neutron absorbing material. Flexible members extend through pivotal joints between the links, establishing serial communication between the links and serving to convey the gas produced as a result of the absorption of neutrons by said material into said gas collection means.

1 Claim, 4 Drawing Figures

CONTROL ROD FOR NUCLEAR REACTOR

The present invention relates to nuclear reactors and, more particularly, to a control rod for a nuclear reactor, which is in most cases associated with fast nuclear reactors.

BACKGROUND OF THE INVENTION

A control rod for a nuclear reactor is known, which contains a series of pivotally connected links containing a neutron absorbing material and having a means for the collection of the gas produced as a result of the absorption of neutrons by said material.

In said known control rod, the neutron absorbing material only partially occupies the volume of each link. The rest of the volume serves as the means for the collection of the gas, which is necessary to reduce the value of the pressure of the gas acting from the inside onto the sheath of the link. The presence of free spaces in each link results in an overall reduction of the amount of the neutron absorbing material that can be carried by the control rod, and, hence, affects the efficiency of said rod. The service life of this rod is limited by the time during which the pressure of the gas within the link is built up to a critical value (from the point of view of the strength of the sheath of the link). Thus, with the control rod being of the above-described known structure, its service life can be prolonged by increasing the free space in each link, and the overall efficiency of the rod is reduced as a result, and vice versa.

SUMMARY OF THE INVENTION

It is an object of the present invention to step up the overall efficiency of the control rod for a nuclear reactor and, at the same time, to prolong the service life thereof.

This object is accomplished in a control rod for a nuclear reactor, including a series of pivotally joined links accommodating a neutron absorbing material, and having a means for the collection of the gas produced as a result of the absorption of neutrons by this material, in which control rod, in accordance with the present invention, said means for the collection of the gas is accommodated in one of the end portions of the rod, and is pivotally joined with a respective endmost link, said links and said gas collection means being provided with flexible members extending through the pivotal joints between the links, thus establishing serial communication between the links, and serving to convey the gas into said collection means.

The herein disclosed structure for a control rod for a nuclear reactor provides for stepping up the overall efficiency of the rod and prolonging its service life.

BRIEF DESCRIPTION OF THE DRAWINGS

The present invention will be further described in connection with preferred embodiments thereof with reference to the appended drawings, wherein.

DESCRIPTION OF THE PREFERRED EMBODIMENTS

Figure 1:
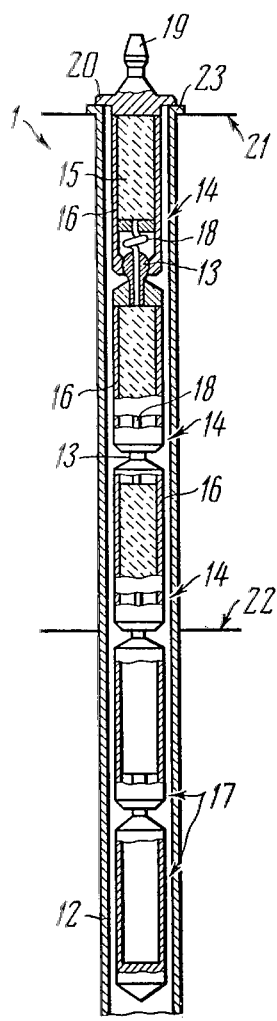
FIG. 1 is a longitudinal sectional view of a control rod for a nuclear reactor embodying the invention.

Referring now in particular to the appended drawings, the herein disclosed control rod 1 (FIG. 1) for a nuclear reactor 2 (FIG. 2) is intended to control the neutron flux within the core 3 of the reactor 2, which in this case is a fast reactor.

The control rod 1 (FIG. 1) is positioned in the core 3 (FIG. 2) of the reactor defined, respectively, by axial and side blankets 4 and 5, and also by a neutron shielding 6. Fuel assemblies 7 (FIG. 3) of the core 3, and fuel assemblies 8 of the side blanket 5 are secured, respectively, in the top and bottom plates 9 and 10 (FIG. 2) of a pressure chamber 11 of the reactor 2, with the plates also having guide sleeves 12 mounted therein (FIG. 1) for the control rods 1.

The presently described control rod 1 is of an articulated type, including five links interconnected through respective pivotal joints 13 and reciprocable within a respective guide sleeve 12. Three links 14 of this control rod 1 are filled with a neutron absorbing material 15, preferably, based on $B^{10}$, accommodated within sealed sheaths 16 of these links 14, the sheaths 16 being of a cylindrical shape. Two bottommost links 17 of the control rod 1 are likewise interconnected and coupled to one of the adjacent links 14 through pivotal joints 13 and serve as the means for the collection of the gas produced as a result of the absorption of neutrons by the material 15.

The internal spaces of the links 14 and 17 communicate with one another by means of flexible members 18 in the form of hollow tubes extending through the pivotal joints 13, with each flexible member 18 including a single helical coil of this tube. This shape for the flexible members 18 compensates for the action of thermal stresses occurring in the operation of the respective adjacent pairs of the links 14 and 17.

Figure 2:
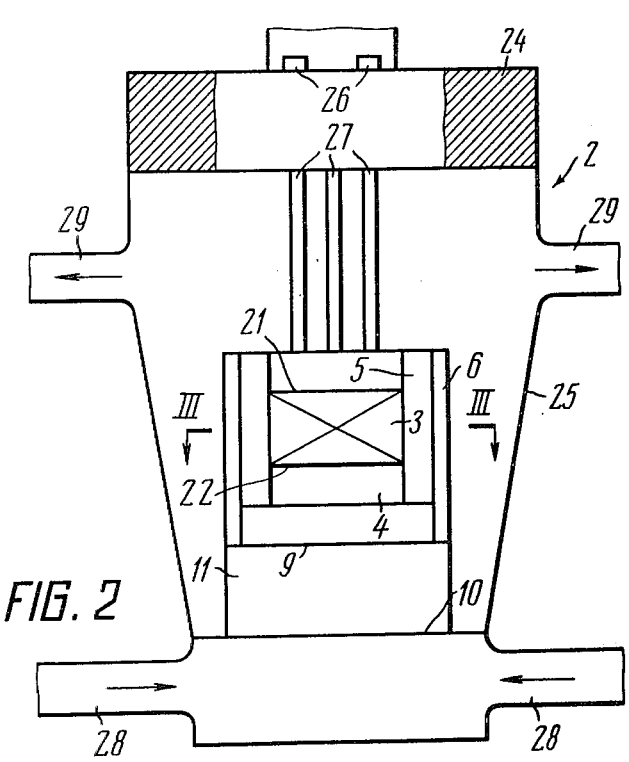
FIG. 2 is a longitudinal sectional view of a fast nuclear reactor incorporating a control rod, in accordance with the invention.

The control rod 1 has a head portion 19 provided with a stop 20, with the head portion being made fast with the sheath 16 of the topmost link 14. As the control rod 1 is introduced into the core 3 (FIG. 2) of the nuclear reactor 2 to extend between top and bottom limits 21 and 22, respectively, of this core; it is retained in a desired position by the stop 20 being placed on the top face 23 (FIG. 1) of the sleeve 12. In this position, the bottommost links 17, acting as the gas collection means, are situated below the bottom limit 22 of the core 3 (FIG. 2).

Figure 3:
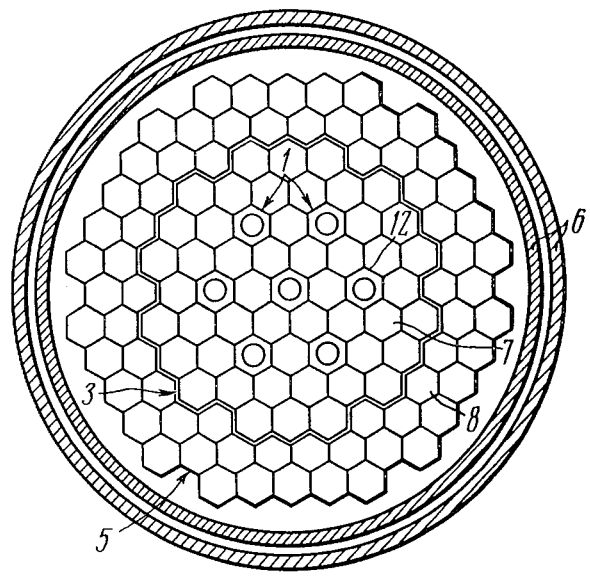
FIG. 3 is a sectional view taken along line III—III of FIG. 2.

In order to effect vertical adjustment of the control rods 1 (FIG. 1) relative to the core 3 (FIG. 2), a lid 24 of a vessel 25 of the nuclear reactor 2 is associated with actuators 26, with a rod 27 of each actuator 26 being adapted to engage the head portion 19 (FIG. 1) of a respective control rod 1 (FIG. 3).

A coolant is introduced into and withdrawn from the vessel 25 (FIG. 2) of the nuclear reactor 2 by means of pressure and outlet connections 28 and 29, respectively. There is also the possibility of having an alternative embodiment for a control rod of a nuclear reactor in accordance with the invention, similar to the one described above.

Figure 4:
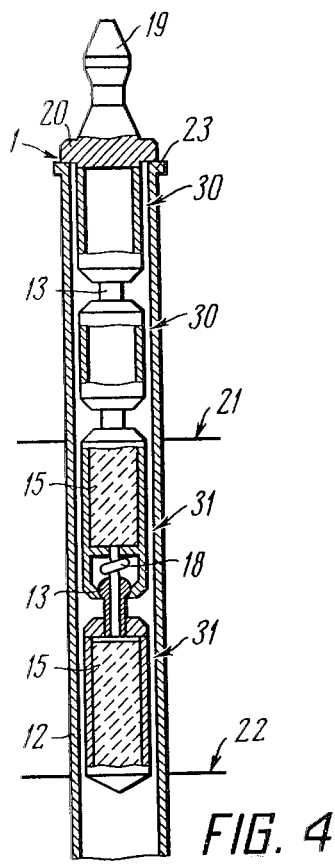
FIG. 4 is a longitudinal sectional view of a control rod for a nuclear reactor, which is an alternative embodiment of the present invention.

The difference between the two embodiments is that in the second embodiment the gas collection means is in the form of two uppermost links 30 (FIG. 4) which are positioned above the top limit 21 of the core 3 (FIG. 2), wherein the control rod is introduced into this core 3, while the two bottommost links 31 (FIG. 4) of the rod are filled with the neutron absorbing material 15.

Both embodiments of the control rod for a nuclear reactor are operated in a similar manner, as follows:

In operation of the core 3 (FIG. 2) of the nuclear reactor 2, the neutron absorbing material 15 (FIGS. 1 and 4) gradually "burns away", and the gas being thus produced, e.g. helium, fills the internal pores of the material 15 itself, and is ultimately collected in the gas collection means after having passed through the successive flexible members 18.

The herein disclosed structure for the control rod of a nuclear reactor provides for stepping up the overall efficiency thereof and, at the same time, prolonging the service life of the rod, owing to the gas collection means, i.e. the means that collects the gas produced by the burning away of the neutron absorbing material, being which positioned outside the core of the reactor, as contrasted to the prior art structures. As compared with the rod of the prior art structure, the control rod in accordance with the invention enables, with the same height of the reactor core, the efficiency of the control rod to be enhanced by filling the gas-accommodating space provided in the known rod with the neutron absorbing material.

What is claimed is:

1. A control rod for a nuclear reactor, accommodated in the core of said reactor and comprising: a series of hollow links; pivotal joints interconnecting said series of links into an articulated structure; at least one of said links of said series, which is the endmost one, serving as a gas collecting means; a neutron absorbing material accommodated in the rest of said links of said series; flexible members extending through said pivotal joints and establishing serial fluid communication between said links, with said flexible members being adapted to convey the gas produced as a result of the absorption of neutrons by said neutron absorbing material to said gas collecting means.

* * * * *